United States Patent [19]

Ford et al.

[11] Patent Number: 4,560,798

[45] Date of Patent: Dec. 24, 1985

[54] PRODUCTION OF AMINOETHYLETHANOLAMINE USING RARE EARTH METAL OR STRONTIUM HYDROGEN PHOSPHATES AS CATALYSTS

[75] Inventors: Michael E. Ford, Center Valley; Thomas A. Johnson, Orefield, both of Pa.

[73] Assignee: Air Products and Chemicals, Inc., Allentown, Pa.

[21] Appl. No.: 664,815

[22] Filed: Oct. 25, 1984

[51] Int. Cl.$^4$ .............................................. C07C 91/04
[52] U.S. Cl. ................................... 564/503; 564/478; 564/479; 564/480
[58] Field of Search ................ 564/479, 478, 480, 503

[56] References Cited

U.S. PATENT DOCUMENTS

| | | |
|---|---|---|
| 2,937,176 | 5/1960 | Herrick . |
| 2,985,658 | 5/1961 | Krause . |
| 3,166,558 | 1/1965 | Mascioli . |
| 3,172,891 | 3/1965 | Brader et al. . |
| 3,297,701 | 1/1967 | Brader et al. . |
| 3,342,820 | 9/1967 | Brader et al. . |
| 3,383,417 | 5/1968 | Lichtenwalter . |
| 4,036,811 | 7/1977 | Noetzel et al. . |
| 4,049,657 | 9/1977 | Brennan et al. . |
| 4,095,022 | 6/1978 | Brennan et al. . |
| 4,103,087 | 7/1978 | Brennan . |
| 4,117,227 | 9/1978 | Brennen . |
| 4,405,784 | 9/1983 | Wells . |

FOREIGN PATENT DOCUMENTS 399201  10/1933  United Kingdom ................ 564/480

*Primary Examiner*—Thomas A. Waltz
*Assistant Examiner*—Elizabeth A. Flaherty
*Attorney, Agent, or Firm*—Russell L. Brewer; E. Eugene Innis; James C. Simmons

[57] ABSTRACT

This invention pertains to the production of aminoethylethanolamine in high selectivity by the intermolecular condensation of monoethanolamine with itself. Selective intermolecular condensation is achieved by reacting monoethanolamine with itself at a temperature from 175°–275° C., and a pressure from 50–400 psig, said reaction being carried out in the presence of a rare earth metal or a strontium metal hydrogen phosphate.

4 Claims, No Drawings

PRODUCTION OF AMINOETHYLETHANOLAMINE USING RARE EARTH METAL OR STRONTIUM HYDROGEN PHOSPHATES AS CATALYSTS

TECHNICAL FIELD OF THE INVENTION

The present invention relates to the preparation of aminoethylethanolamine by the condensation of monoethanolamine with itself in the presence of a rare earth metal hydrogen phosphate or strontium hydrogen phosphate catalyst and is more particularly concerned with the production of such amine compound in enhanced yields and selectivity.

BACKGROUND OF THE PRIOR ART

Amine synthesis via condensation reactions between organic hydroxy compositions and ammonia or an amine resulting in a loss of a molecule of water is well known in the art. Certain such reactions are generally effected in the presence of acidic catalysts. One important area in which such acid catalysis has been employed is in cyclization reactions, as in the synthesis of triethylenediamine (sometimes referred to as TEDA) and its substituted homologues. The following patents are representative of cyclization reactions.

U.S. Pat. No. 2,937,176 discloses the preparation of TEDA by passing an aliphatic amine, such as an alkylene polyamine or alkanolamine over an acidic silica-alumina catalyst at a temperature from 300°–500° C. Diethylenetriamine and N-2-hydroxyethylethylenediamine are noted as being representative reactants for conversion to TEDA.

U.S. Pat. Nos. 2,985,658 and 3,166,558 disclose the preparation of TEDA by effecting condensation of N-aminoethylpiperazine over an acidic silica-alumina catalyst or an activated kaolin catalyst.

U.S. Pat. Nos. 3,172,891; 3,342,820; and 3,297,701 disclose the preparation of TEDA by reacting hydroxyethoxyethylamine with ammonia or the C-alkyl derivatives of TEDA by reacting hydroxyalkyl alkylpiperazine derivatives at a temperature from 250°–500° C. in the presence of an aluminum phosphate catalyst. U.S. Pat. No. 3,342,820 discloses the use of aluminum phosphate containing an alkali metal as a catalyst for the condensation reaction and alleges enhanced activity. Other examples of trivalent metal phosphates having catalytic activity include boron, bismuth and iron phosphates. U.S. Pat. No. 3,297,701 suggests additional metal phosphate catalysts can be used for effecting the condensation reaction and these metal phosphates include iron phosphate, zinc phosphate, nickel phosphate, copper phosphate, chromium phosphate and cobalt phosphate.

U.S. Pat. No. 4,117,227 discloses the preparation of substituted morpholine compositions by reacting an N-substituted diethanolamine over a phosphorus containing substance. Specific reactions illustrate the conversion of triethanolamine to hydroxyethylmorpholine or dimorpholinodiethylether. Various alkyl and aryl substituted phosphorus and phosphoric acids are alleged as being suited as catalysts and specific catalysts include methylphenylphosphonate, phenylphosphinic acid and ethylphosphonic acid.

U.S. Pat. No. 4,405,784 discloses the preparation of TEDA from hydroxyethylpiperazine and from diethanolamine by effecting a condensation reaction over strontium hydrogen phosphate. Dimethylaminoethylmorpholine was also produced over strontium hydrogen phosphate by condensing dimethylethanolamine with morpholine.

Intermolecular condensations between a hydroxy compound and ammonia or an amine to form coupled or cyclic compositions are also known. Representative patents showing the preparation of alkyl amines, polyamines and morpholine are as follows:

U.S. Pat. No. 3,383,417 discloses the intermolecular condensation of monoethanolamine with itself at pressures from 2000–4000 psig in the presence of a reductive amination catalyst. It has use as a dispersant for lubricating oils, a textile conditioner, a nonionic surfactant for shampoo and hair rinses.

U.S. Pat. No. 4,036,811 is representative of techniques for producing polyalkylene polyamines where, for example, monoethanolamine is reacted with ethylenediamine in the presence of a phosphorus-containing composition such as the alkyl and aryl phosphonates. In addition acidic metal phosphates, such as boron phosphate, ferric phosphate, and aluminum phosphate are suggested as being suited for effecting the reaction.

U.S. Pat. Nos. 4,103,087; 4,095,022 and 4,049,657 disclose the preparation of a variety of heterocyclic amines by reacting a disubstituted aminoalkanol in the presence of an acid metal phosphate catalyst, e.g., aluminum phosphate or phosphoric acid compound. The '022 patent shows the reaction of a hydroxyalkylmorpholine to produce the bis-morpholino-N-alkyl-ether, the reaction being carried out in the presence of an acid metal phosphate. U.S. Pat. No. 4,049,657 produces N-aminoalkylpiperazine by reacting piperazine with a primary or secondary aminoalkanol in the presence of a phosphorus-containing substance such as an alkyl or aryl phosphinate or acidic metal phosphate.

SUMMARY OF THE INVENTION

This invention pertains to an improved process for the intermolecular condensation of monoethanolamine with itself. One of the basic methods for amine synthesis comprises a process for the synthesis of an organic amine by the intermolecular condensation of an organic hydroxy composition with ammonia or a primary or secondary amine, such condensation being effected in the presence of a rare earth or strontium metal hydrogen phosphorus-containing compound as a catalyst. The improved process is, in a more specific aspect, a method for effecting the intermolecular condensation of monoethanolamine with itself by utilizing a rare earth metal hydrogen phosphate or strontium hydrogen phosphate as a catalyst to effect the condensation reaction by maintaining a pressure from about 50 to 400 psig and a temperature from 175° to 275° C.

There are significant advantages of using a rare earth hydrogen phosphate strontium hydrogen phosphate as a catalyst for effecting intermolecular reactions of monoethanolamine while using relatively low temperatures and low pressures; some of the potential advantages include:

an ability to effect efficient intermolecular condensation of an amine hydrogen with a hydroxy group rather than effecting intramolecular condensation as normally is associated with hydroxyamines;

an ability to operate under vapor phase conditions utilizing a heterogeneous catalyst system thereby facilitating production and separation of materials;

an ability to achieve good catalyst life due to substantial insolubility of the catalyst in the reaction medium and due to the ability to maintain gas phase reaction conditions; and an ability to produce aminoethylethanolamine in high yield.

DETAILED DESCRIPTION OF THE INVENTION

In the condensation of an organic hydroxy composition with an amino composition, both intermolecular condensations and intramolecular condensations, (the latter reaction occurring between an amino group and a hydroxy group present in the same molecule), can be effected to form a variety of aliphatic and cyclic amines. In intramolecular condensations the compositions, which contain both hydroxyl and amino hydrogen functionality tend to form cyclic compositions. Because monoethanolamine is capable of both intermolecular and an intramolecular condensation and because the intramolecular reaction is favored, cyclic amino products have been produced in predominant proportions. It has been found that one can selectively limit the reaction to a single intermolecular condensation if extreme care is taken and appropriate catalysts are used.

The catalysts which are suited for practicing the selective intermolecular condensation of this invention are Group IIIB metal and strontium acid phosphates, including Group IIIB metal and strontium monohydrogen phosphates, dihydrogen phosphates and mixtures thereof. These are conventionally prepared by reacting a hydrogen phosphate precursor with a rare earth metal salt or a strontium salt. Typically, an alkali metal or ammonium monohydrogen or dihydrogen phosphate is reacted with a water soluble strontium or rare earth metal salt, the rare earth being scandium, yttrium, lanthanum and those of the lanthanide series having atomic numbers 58–71, and those of the actinide series having atomic numbers from 89–92. Typically, an alkali metal or ammonium monohydrogen or dihydrogen phosphate is reacted with a water soluble strontium or rare earth metal salt. Phosphoric acid can also be used as a hydrogen phosphate precursor. In addition, solution pH may be adjusted by addition of ammonia or acid to provide an active catalyst. U.S. Pat. No. 3,752,878 is representative, and is incorporated by reference.

While the intent of the catalyst preparations described herein is to specifically provide a particular Group IIIB monohydrogen or dihydrogen phosphate, mixtures of the Group IIIB phosphates of the above-mentioned types may be obtained owing to complicated dependence of the catalyst composition on preparation conditions. Nevertheless, although the Group IIIB metal acid phosphate catalyst of the invention comprises the metal phosphate, monohydrogen phosphate, dihydrogen phosphate or mixtures thereof the monohydrogen and dihydrogen phosphates of the Group IIIB metals in relatively pure form individually or in combination would be preferred. For purposes of the invention, the term rare earth metal acid phosphate or strontium hydrogen phosphate is intended to include a single product or a mixture of products obtained by contacting a rare earth metal salt with a alkali metal or ammonium monohydrogen or dihydrogen phosphate or other hydrogen phosphate precursor to convert substantially all of the rare earth metal or strontium salt to the monohydrogen or dihydrogen phosphate. Usually, this level is from 0.5 to 3.0 moles phosphate salt per mole of rare earth metal or strontium salt. Preferably the molar ratio is at least 1:1 phosphate salt per mole metal salt.

The preferred catalysts for production of aminoethylethanolamine include the acid phosphates, and preferably the monohydrogen and dihydrogen phosphates, of lanthanium, cerium, praseodymium, neodymium, yttrium, samarium, thulium, erbium, ytterbium, lutetium, and dysprosium and mixtures thereof. Lanthanum acid phosphates are intended to include those catalysts in which at least 80 weight percent of the metal is lanthanum.

The quantity of rare earth metal acid phosphate salt used in the condensation reaction can vary widely depending upon the activity of the particular catalyst used. In any event, a sufficient amount of catalyst is included in the reaction to be catalytically effective, i.e. an amount which causes the condensation between the hydrogen atom of the amine group with the hydroxyl group. In batch reactions the amount ranges from about 0.1 to 25% by weight based upon the combined weights of the hydroxy composition and the amino composition. Within this range, the level of catalyst utilized is empirical, depending upon the reactivity and conditions utilized. The conditions and catalyst level are adjusted to optimize product conversion and selectivity. Generally, at least 90% and preferably 100% by weight of the catalyst (excluding supports) used in the reaction is the rare earth metal acid phosphate, and the reaction may be carried out in about 1–3 hours.

The reactions can be carried out in continuous mode as well as the batch mode, as for example in a continuous stirred tank reactor or a packed bed reactor. When the reaction is carried out in a packed bed reactor, the feed rate (LHSV) is from 0.05–5 hr$^{-1}$, based on monoethanolamine. Calculation of LHSV is based upon feed rates to the reactor. The precise condition of gas or liquid phase within the reactor is not known and need not be determined to carry out the reaction.

The intermolecular condensation between an amine hydrogen and hydroxyl group of two molecules of monoethanolamine in which there is a resultant loss of a molecule of water can be effected at moderate temperatures e.g. 175° C. and up to 275° C. at pressures ranging from 50 to 400 psig. Pressures higher than 400 psig appear to serve no useful purpose.

Both temperature and pressure are important process variables for achieving high selectivity to aminoethylethanolamine. For example, if the temperature is near the upper end of the range, there is a tendency for the product to cyclize especially at the lower pressures. Cyclization also is more predominant as pressure is increased, e.g., greater than about 400 psig at a given temperature. Therefore, it is preferable to maintain both pressure and temperatures at relatively low levels.

The following examples are provided to illustrate the intermolecular condensation of monoethanolamine using the concepts of this invention.

EXAMPLE 1

Catalyst Preparation

The general technique for preparing lathanum acid phosphate was effected by dissolving a preselected quantity (in grams (g)) of lanthanum nitrate in 500 cc of distilled water. Then, a preselected quantity in grams (g) of ammonium dihydrogen phosphate—$(NH_4)H_2PO_4$—was dissolved in a separate vessel containing 500 cc distilled water. The two salt solutions were then combined and stirred at room temperature for about 10 minutes to form a thick, creamy suspension. After stirring, the suspension was vacuum filtered, and the resulting precipitate washed with distilled water and air dried overnight in a static oven at approximately 90° C. The filter cake was then broken into small (12 to 18 mesh) irregular granules for evaluation. The solution prior to precipitation was measured for solution pH as determined by acid-base indicators. If the pH were greater than 4, it was believed that insufficient hydrogen phosphate source had been reacted to produce a desired catalyst. A solution pH of 1 to 3 was deemed preferable; acid or base was used to adjust solution pH. The ammonium dihydrogen phosphate gave the lanthanum acid phosphate.

EXAMPLE 1

Intermolecular Condensation of Monoethanolamine

The reaction of monoethanolamine (MELA) with itself was carried out in a conventional fixed bed catalytic reactor. More particularly, monoethanolamine as a 1:1 volume/volume mixture with tetraglyme was fed to a ½ inch diameter stainless steel tubular reactor containing approximately 6 grams of lanthanum dihydrogen phosphate. The reaction was carried out at an LHSV of 0.5 or 1.0 (based upon MELA feed only). The reaction product was cooled and analyzed by gas chromatograph techniques. Tables 1 and 2 provide information as to the run conditions including process conditions and catalysts used and analytical results.

TABLE 1

| | | PRODUCTION OF AEEA FROM MELA | | | | | | |
|---|---|---|---|---|---|---|---|---|
| | | LHSV | Temp | Press. | Conv.[b] | Selectivity[b] | | |
| | Catalyst | $(Hr^{-1})^a$ | (°C.) | (psig) | (%)[c] | AEEA[d] | HEDETA[e] | Cyclics[f] |
| Example | | | | | | | | |
| 1 | Lanthanum Acid Phosphate | 0.5 | 205 | 300 | 11 | 91 | 0 | 9 |
| 2 | Lanthanum Acid Phosphate | 0.5 | 215 | 300 | 13 | 93 | 2 | 5 |
| 3 | Lanthanum Acid Phosphate | 0.5 | 235 | 300 | 15 | 92 | 4 | 4 |
| 4 | Lanthanum Acid Phosphate | 0.5 | 265 | 300 | 15 | 57 | 17 | 26 |
| 5 | Lanthanum Acid Phosphate | 1.0 | 215 | 300 | 6 | 94 | 0 | 6 |
| 6 | Lanthanum Acid Phosphate | 1.0 | 225 | 300 | 10 | 83 | 1 | 16 |
| 7 | Lanthanum Acid Phosphate | 1.0 | 235 | 300 | 14 | 79 | 3 | 18 |
| 8 | Lanthanum Acid Phosphate | 1.0 | 245 | 300 | 22 | 79 | 8 | 13 |
| 9 | Lanthanum Acid Phosphate | 1.0 | 255 | 300 | 30 | 74 | 11 | 15 |
| 10 | Lanthanum Acid Phosphate | 1.0 | 235 | 150 | 10 | 94 | 0 | 6 |
| 11 | Lanthanum Acid Phosphate | 1.0 | 245 | 150 | 10 | 93 | 3 | 4 |
| 12 | Lanthanum Acid Phosphate | 1.0 | 255 | 150 | 16 | 77 | 9 | 14 |
| 13 | Mixed Metal Acid Phosphate | 1.0 | 215 | 300 | 8 | 92 | 0 | 8 |
| 14 | Mixed Metal Acid Phosphate[g] | 1.0 | 225 | 300 | 11 | 82 | 6 | 12 |
| 15 | Mixed Metal Acid Phosphate[g] | 1.0 | 235 | 300 | 21 | 75 | 10 | 15 |
| 16 | Mixed Metal Acid Phosphate[g] | 1.0 | 245 | 300 | 23 | 63 | 15 | 22 |
| 17 | Mixed Metal Acid Phosphate[g] | 1.0 | 255 | 300 | 45 | 53 | 15 | 32 |
| 18 | Strontium Hydrogen Phosphate | 1.0 | 235 | 300 | 29 | 67 | 9 | 24 |
| Comparative Example | | | | | | | | |
| 1 | Lanthanum Acid | 1.0 | 318 | 0 | 77 | 1 | 0 | 99 |

TABLE 1-continued

PRODUCTION OF AEEA FROM MELA

| Catalyst | LHSV (Hr$^{-1}$)$^a$ | Temp (°C.) | Press. (psig) | Conv.$^b$ (%)$^c$ | Selectivity$^b$ AEEA$^d$ | HEDETA$^e$ | Cyclics$^f$ |
|---|---|---|---|---|---|---|---|
| Phosphate | | | | | | | |

Notes to Table 1
$^a$Based on monoethanolamine.
$^b$Results are derived from analyses presented in Table 2, and are rounded off to the nearest integer.
$^c$Based on unchanged monoethanolamine.
$^d$Weight percent of aminoethylethanolamine in the total product.
$^e$Weight percent of linear and branched isomers of hydroxyethyldiethylenetriamine in the total product.
$^f$Weight percent of cyclic polyethylene amines, based on the total product.
$^g$Catalyst comprises a mixture of lanthanum, cerium, praseodymium, and neodymium in a 9.6:2.2:1.0:3.1 weight ratio, respectively.

TABLE 2

PRODUCT SLATE$^a$

| | PIP$^b$ | AEEA$^c$ | AEP$^d$ | HEDETA$^e$ | BAEP$^f$ | PEEDA$^g$ |
|---|---|---|---|---|---|---|
| Example | | | | | | |
| 1 | 2.4 | 90.6 | 3.5 | 0.0 | 3.5 | 0.0 |
| 2 | 1.8 | 92.7 | 2.0 | 1.6 | 1.9 | 0.0 |
| 3 | 2.0 | 92.2 | 1.5 | 4.3 | 0.0 | 0.0 |
| 4 | 6.2 | 57.2 | 8.9 | 17.0 | 4.5 | 6.2 |
| 5 | 2.2 | 94.3 | 3.5 | 0.0 | 0.0 | 0.0 |
| 6 | 3.4 | 82.6 | 6.2 | 1.3 | 2.6 | 3.8 |
| 7 | 3.9 | 78.9 | 7.5 | 2.9 | 2.9 | 2.2 |
| 8 | 3.4 | 78.8 | 4.9 | 7.8 | 3.2 | 1.8 |
| 9 | 4.2 | 74.3 | 5.6 | 10.5 | 3.2 | 2.1 |
| 10 | 1.3 | 94.5 | 4.3 | 0.0 | 0.0 | 0.0 |
| 11 | 2.3 | 93.4 | 1.3 | 3.0 | 0.0 | 0.0 |
| 12 | 4.2 | 77.3 | 4.2 | 9.3 | 3.0 | 1.9 |
| 13 | 2.2 | 91.9 | 5.9 | 0.0 | 0.0 | 0.0 |
| 14 | 2.7 | 82.5 | 4.4 | 5.6 | 2.6 | 2.3 |
| 15 | 3.6 | 75.2 | 5.0 | 10.2 | 3.0 | 2.9 |
| 16 | 4.9 | 62.6 | 7.7 | 14.5 | 5.1 | 5.1 |
| 17 | 6.3 | 52.8 | 10.7 | 15.2 | 7.3 | 7.8 |
| 18 | 5.6 | 66.7 | 9.6 | 8.8 | 9.3 | 0.0 |
| Comparative Example | | | | | | |
| 1 | 27.34 | 0.87 | 33.10 | 0.0 | 27.65 | 9.54 |

Notes to Table 2
$^a$Weight percent of products, on a water-free, feedstock-free, weight-normalized basis.
$^b$Piperazine
$^c$Aminoethylenethanolamine
$^d$Aminoethylpiperazine
$^e$Hydroxyethyldiethylenetriamine, linear and branched isomers.
$^f$Bis(aminoethyl)piperazine
$^g$Piperazinoethylethylenediamine Conversion of monoethanolamine is temperature dependent, and increases as reaction temperature is raised. However, at higher temperatures, selectivity to aminoethylethanolamine decreases, and mixed cyclic polyamines are formed as by-products (see Table 1). Further, operation at 300 psig rather than 150 psig also increases conversion of monoethanolamine and decreases selectivity to aminoethylethanolamine (cf Examples 7 and 10, 8 and 11, and 9 and 12). From these data the preferred temperature is from about 205°–255° C. at pressures from 100–200 psig and temperatures from about 175° C. to 235° C. are preferred at pressures from 200–300 psig.

The comparative example dramatically shows the tendency of monoethanolamine to cyclize when reacted at high temperature and low pressure.

What is claimed is:

1. In a process for the synthesis of an organic amine by the intermolecular condensation of a hydroxy composition with ammonia or a primary or secondary amine said condensation being effected in the presence of a phosphorus-containing compound as a catalyst, the improvement for producing aminoethylethanolamine in high selectivity which comprises:

effecting self condensation of monoethanolamine in the presence of a catalyst comprising a rare earth metal acid phosphate selected from the group consisting of scandium, yttrium, lanthanum and the rare earth lanthanides having an Atomic Number from 58 to 71 at a pressure from 50 to 400 psig and a temperature from 175° to 275° C.

2. The process of claim 1 wherein rare earth metal acid phosphate is lanthanum acid phosphate.

3. The process of claim 1 wherein said reaction is carried out at a pressure from 100 to 200 psig and a temperature from 205° to 255° C.

4. The process of claim 2 wherein the reaction is carried out at a pressure from about 200 to 300 psig and a temperature from 175° to 235° C.

* * * * *